(12) United States Patent
Ishikawa

(10) Patent No.: US 7,405,845 B2
(45) Date of Patent: Jul. 29, 2008

(54) IMAGE PROCESSING APPARATUS

(75) Inventor: Atsushi Ishikawa, Anjo (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 1051 days.

(21) Appl. No.: 09/996,786

(22) Filed: Nov. 30, 2001

(65) Prior Publication Data

US 2002/0057444 A1    May 16, 2002

(30) Foreign Application Priority Data

Dec. 1, 2000    (JP)    ............... 2000-366739

(51) Int. Cl.
G06F 15/00    (2006.01)
G06K 9/46    (2006.01)

(52) U.S. Cl. .................. 358/1.9; 358/2.1; 358/3.26; 382/176; 382/192; 382/193; 382/194; 382/267; 382/275

(58) Field of Classification Search .......... 382/272, 382/275, 260, 176, 261, 251–252, 173, 270, 382/175, 233, 273, 192, 193, 194, 267, 295; 358/3.01, 3.03, 3.05, 2.1, 1.9, 3.21, 3.22, 358/3.24, 462, 3.26, 532–533

See application file for complete search history.

(56) References Cited

U.S. PATENT DOCUMENTS 5,025,481 A * 6/1991 Ohuchi ............... 382/176
5,454,052 A * 9/1995 Kojima ............... 382/233
5,805,738 A * 9/1998 Kaburagi et al. ........ 382/251
5,870,503 A    2/1999 Kumashiro
6,341,019 B1 * 1/2002 Ohta .................. 358/1.9
6,608,941 B1 * 8/2003 Suzuki et al. ........... 382/272
6,714,676 B2 * 3/2004 Yamagata et al. ........ 382/175

FOREIGN PATENT DOCUMENTS

| JP | 03-109868 | 5/1991 |
| JP | 05-167842 | 7/1993 |
| JP | 05-284358 | 10/1993 |
| JP | 05-307641 | 11/1993 |
| JP | 08-223420 | 8/1996 |
| JP | 10-098613 | 4/1998 |
| JP | 11-136513 | 5/1999 |

OTHER PUBLICATIONS

Japanese Office Action dated Oct. 2, 2007 (with English Translation).

* cited by examiner

Primary Examiner—David Moore
Assistant Examiner—Charlotte M Baker
(74) Attorney, Agent, or Firm—Buchana Ingersoll & Rooney PC

(57) ABSTRACT

Dot characteristic points are first extracted from M-level image data by the dot characteristic point extracting device. A dot area identifying device subsequently identifies a dot area based on the results of the extraction carried out by the dot characteristic point extracting device. When the image attribute determination is completed, a parameter setting unit sets N-level conversion parameters based on the results of the determination carried out by the dot area identifying device. Consequently, N-level conversion takes place using the N-level conversion parameters appropriate for a dot area. Therefore, N-level conversion in which the occurrence of moire is prevented may be carried out regarding dot areas.

14 Claims, 10 Drawing Sheets

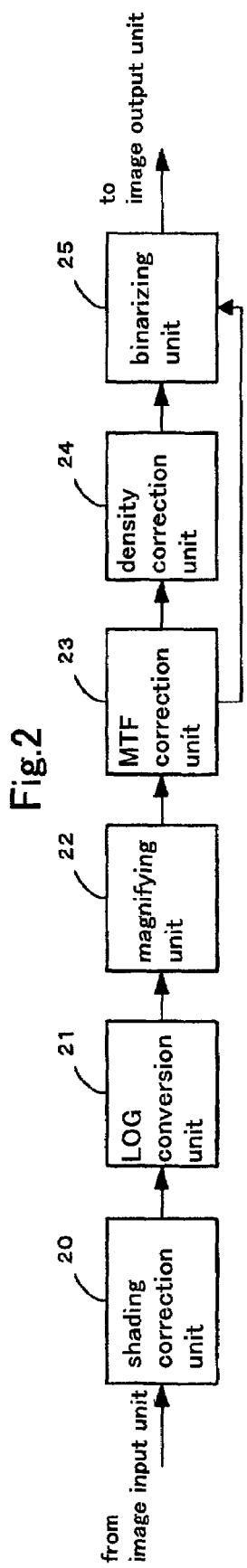

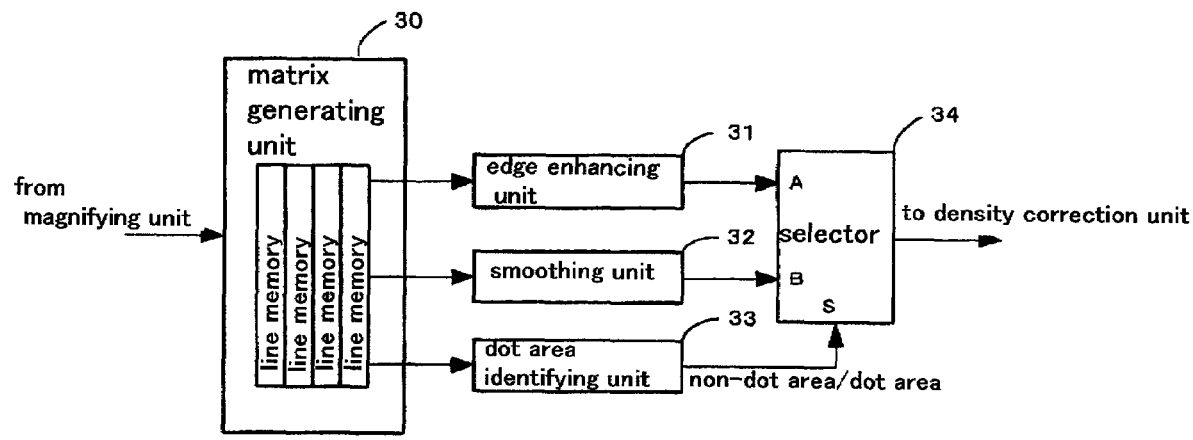

IMAGE PROCESSING APPARATUS

CROSS-REFERENCE TO RELATED APPLICATIONS

This application is based on application No. 2000-366739 filed in Japan, the contents of which is hereby incorporated by reference.

BACKGROUND OF THE INVENTION

1. Field of the Invention

This invention relates to an image processing apparatus that processes images using digital image signals, and more particularly to an image processing apparatus capable of preventing the moire phenomenon that occurs when the number of gradations of the image data in dot areas is reduced.

2. Description of the Related Art

In a conventional image processing apparatus, the attribute of the image is first identified (i.e., character area or photograph area) to enable processing appropriate to such attribute to be carried out. Specifically, processing focusing on resolution is carried out regarding a character area, while processing focusing on gradation is performed regarding a photograph area. In such attribute determination, a process that uses the density difference in M-level image data is widely used. This technology uses the characteristic fact that a character area includes substantial edge components (i.e., that the density difference is large; see FIG. 12), and a photograph area has a flat density distribution (i.e., that the density difference is small; see FIG. 13).

However in a dot area, moire may occur due to interference between the resolution for image reading and the dot frequency of the original document. When moire occurs, the image quality deteriorates. Even if this moire is not conspicuous in an M-level image, when the image is converted into an N-level image (M>N), i.e., when the number of gradations of the image is reduced, it becomes markedly visible. Therefore, an N-level conversion process that prevents the occurrence of moire has been desired.

In the conventional image processing apparatus described above, however, the problem exists that moire becomes conspicuous in dot areas after N-level conversion (i.e., when the number of gradations is reduced), because, while it is desirable to preserve linear gradation in dot areas, such preservation is not possible when processing that uses the density difference is used. In other words, as shown in FIG. 14, a dot area is judged to be more character-like than a character area as the read resolution increases, and processing focusing on resolution is carried out on the dot area. In addition, because dot areas indicate various density patterns depending on such conditions as the screen angle, density and read resolution, it is difficult to accurately identify a dot area via processing using density difference. That is one of the reasons that appropriate processing cannot be performed on dot areas. Because N-level conversion that preserves linear gradation cannot be carried out regarding dot areas, as described above, moire visually stands out in such areas.

OBJECTS AND SUMMARY

The present invention was created in order to resolve these problems, and it is an object of the present invention to provide an image processing apparatus that can prevent the moire phenomenon that occurs when the image data in a dot area is converted into N-level image data (i.e., when the number of gradations of the image is reduced).

A first aspect is an image processing apparatus that carries out image processing on M-level image data in accordance with image attribute, the image processing apparatus comprising a dot characteristic point extracting device that extracts dot characteristic points from the M-level image data; a dot area identifying device that determines whether a target pixel belongs to a dot area based on the results of the extraction carried out by the dot characteristic point extracting device; an N-level conversion unit that converts the M-level image data into N-level image data (M>N); and a parameter setting unit that sets the N-level conversion parameters used by the N-level conversion unit based on the results of the determination carried out by the dot area identifying device.

In an embodiment, dot characteristic points are first extracted from the M-level image data by the dot characteristic point extracting device. The dot area identifying device subsequently identifies a dot area based on the results of the extraction carried out by the dot characteristic point extracting device. The dot characteristic point extracting device extracts as dot characteristic points isolated points having a density difference of a specified minimum value from their surrounding pixels, for example, and the dot area identifying device identifies a dot area by comparing with a specified threshold value the number of isolated points existing in an area of a specified size that includes the target pixel. For the threshold value, the number of isolated points from which it can be determined that the target pixel—which is contained in the center of the area—is included in a dot area may be used. In other words, the number of isolated points from which it can be determined that the area is likely to comprise a dot area should be designated as the threshold value.

When the image attribute determination is completed, the parameter setting unit sets the N-level conversion parameters in the N-level conversion unit based on the results of the determination carried out by the dot area identifying device. In other words, N-level conversion parameters that enable N-level conversion suited to each attribute are set. In the embodiment, N-level conversion parameters that enable processing that focuses on gradation are specified for dot areas. The N-level conversion unit then converts the M-level image data into N-level image data (M>N) using the N-level conversion parameters set by the parameter setting unit.

As described above, in this embodiment, N-level conversion parameters used for N-level conversion are specified based on the results of the determination carried out by the dot area identifying device. Consequently, N-level conversion takes place using N-level conversion parameters appropriate for a dot area. Therefore, N-level conversion in which the occurrence of moire is prevented may be carried out regarding dot areas.

The embodiment further includes an area-identifying device that determines whether the target pixel belongs to a character area or a photograph area based on the difference between the largest density value and the smallest density value in the area of a certain size including the target pixel, and the parameter setting unit specifies N-level conversion parameters in the N-level conversion unit based on the results of the determination carried out by the area identifying device and the results of the determination carried out by the dot area identifying device.

When a determination as to whether the area including the target pixel is a character area or a photograph area is carried out in this way, in addition to the identification of a dot area, and N-level conversion parameters are set in the N-level conversion unit using such determination results, N-level conversion is carried out using appropriate N-level conversion parameters that are suited to the attribute of the image. Therefore, N-level conversion in which the occurrence of moire is prevented is enabled regarding dot areas, while N-level conversion is carried out regarding character areas with a focus on resolution and regarding photograph areas with a focus on gradation. Consequently, a high-quality image may be reproduced. The area identifying device should determine that an area is a character area when the density difference mentioned above is large, and that the area is a photograph area when the density difference is small, for example.

It is also preferred in the embodiment that the N-level conversion unit performs N-level conversion of M-level image data using the error diffusion method because this method does not exhibit periodicity, unlike the dither method, and moire does not easily occur when it is used.

It is further preferred that the N-level conversion parameters set by the parameter setting unit comprise an N-level conversion error gain adjustment value and/or an N-level conversion reference value.

By making the N-level conversion error gain adjustment value variable, the degree of error diffusion in the surrounding image changes when N-level conversion is performed. For example, if the N-level conversion error gain adjustment value approaches '0', the processing approaches the simple N-level conversion. That is, N-level conversion is carried out with little consideration of errors in the surrounding pixels. In this case, good contrast reproducibility results. Conversely, where the N-level conversion error gain adjustment value approaches '1', the processing approaches the binarization process in which the errors in the surrounding pixels are diffused (error diffusion calculation method). In this case, good gradation reproducibility results. Therefore, by setting an N-level conversion error gain adjustment value based on the results of the determination carried out by the area identifying device and the results of the determination carried out by the dot area identifying device, binarization appropriate to the attribute of the image may be obtained. Therefore, N-level conversion in which the occurrence of moire is prevented may be obtained for a dot area by setting the gain adjustment value to be '1'.

On the other hand, when the N-level conversion reference value is variable, the γ-correction characteristics may be varied during N-level conversion. Therefore, by setting an N-level conversion reference value based on the results of the determination carried out by the area identifying device and the results of the determination carried out by the dot area identifying device, γ-correction appropriate for the attribute of the image may be performed for a very small area. Therefore, by setting such an N-level conversion reference value for dot areas that will enable N-level conversion preserving linear gradation, the occurrence of moire in the dot areas may be prevented.

The second aspect is image processing method for carrying out image processing on M-level image data in accordance with image attribute, the image processing method comprising the steps of extracting dot characteristic points from the M-level image data; determining whether a target pixel belongs to a dot area based on the dot characteristic point extraction result; setting N-level conversion parameters based on the dot area determination result; and converting the M-level image data into N-level image data (M>N) using the set N-level conversion parameters.

These and other objects, advantages and features of the invention will become apparent from the following description thereof taken in conjunction with the accompanying drawings which illustrate specific embodiments of the invention.

BRIEF DESCRIPTION OF THE DRAWINGS

FIG. 2 is a block diagram illustrating the basic construction of the image processing unit shown in FIG. 1;

FIG. 3 is a block diagram illustrating the basic construction of the MTF correction unit shown in FIG. 2;

FIG. 4 is an illustration of the data construction of 5×5 matrix image signals;

In the following description, like parts are designated by like reference numbers throughout the several drawings.

DESCRIPTION OF THE PREFERRED EMBODIMENTS

The present invention will be described in detail below using the best embodiment and with reference to the drawings. This embodiment comprises a digital reproduction machine in which the image processing apparatus pertaining to the present invention is applied.

Figure 1:
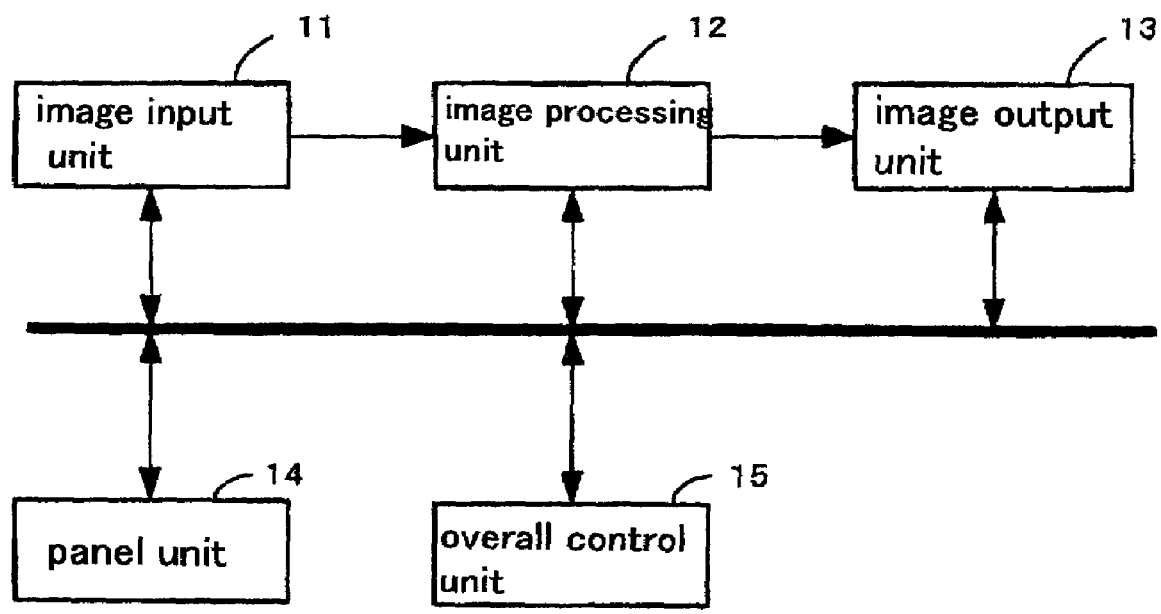
FIG. 1 is a block diagram illustrating the basic construction of a digital reproduction machine pertaining to an embodiment.

FIG. 1 shows the basic construction of the reproduction machine of this embodiment. This reproduction machine includes an image input unit 11, an image processing unit 12, an image output unit 13, a panel unit 14, and an overall control unit 15. Image data is obtained by the image input unit 11. Specifically, the original document is scanned by a scanner, and the light reflected off from the original document is received by a CCD sensor and subjected to photoelectric conversion in order to obtain analog image data. This analog image data is converted into digital image data, and is then sent to the image processing unit 12.

The image processing unit 12 carries out various types of processing with regard to the digital image data sent from the image input unit 11. This image processing unit 12 includes, as shown in FIG. 2, a shading correction unit 20, a reflection rate/density conversion (hereinafter referred to as 'LOG conversion') unit 21, a magnifying unit 22, an MTF correction unit 23, a density correction unit 24 and a binarizing unit 25.

The shading correction unit 20 eliminates unevenness in light amount of the image in the main scanning direction. Specifically, during the operation to read the image of the original document, the light reflected from a white plate, which is used for shading correction purposes, is received by the CCD sensor, and the analog data thus obtained is converted into digital data, which is then stored in the memory. Using the digital data stored in the memory as the reference value, the data read from the original document is corrected while it is being read.

The LOG conversion unit 21 performs LOG conversion using a look-up table in order to obtain density scale image data. The magnifying unit 22 enlarges or reduces the image in the main scanning direction through control of the writing to and reading from the memory. The MTF correction unit 23 performs correction regarding the sharpness and other aspects of the image. The details regarding the MTF correction unit 23 will be provided below. The density correction (γcorrection) unit 24 carries out density correction in accordance with such settings as the image mode and exposure level. The binarizing unit 25 converts the multi-value image data into binary image data using the error diffusion method. The binarizing unit 25 performs binarization with reference to the data obtained by the MTF correction unit 23 as well. The details regarding the binarizing unit 25 will also be provided below.

The image data that has undergone processing by the various processing units 20 through 25 is transmitted to the image output unit 13 from the image processing unit 12.

Returning to FIG. 1, the image output unit 13 forms an image on the recording medium based on the image data. The panel unit 14 is used by the operator to set such parameters as the image mode, original document size and exposure level, which are needed when making reproduction copies. Reading of the image is begun in the reproduction machine via the start key included in the panel unit 14. The overall control unit 15 is responsible for the comprehensive control of the entire reproduction machine based on the settings information from the panel unit 14.

The basic construction of the MTF correction unit 23, which is included in FIG. 2, is shown in FIG. 3. The MTF correction unit 23 includes a matrix generating unit 30, an edge enhancing unit 31, a smoothing unit 32, a dot area identifying unit 33 and a selector 34. Based on this construction, the MTF correction unit 23 carries out the processes of edge enhancement, smoothing and area determination using a two-dimensional digital filter. Specifically, edge enhancement and smoothing are performed in accordance with the image mode and other factors. In other words, if character mode is activated, edge enhancement is reinforced, but if photograph mode is activated, edge enhancement is reduced. The matrix generating unit 30 generates the 5×5 pixel matrix image data shown in FIG. 4 using line memories.

The selector 34 selects whether to carry out the smoothing process or the edge enhancement process based on the attribute of the image. Therefore, the image data that has undergone edge enhancement is input to the terminal A of the selector 34 from the edge enhancing unit 31. Image data that has undergone smoothing is input to the terminal B of the selector 34 from the smoothing unit 32. A signal regarding the image attribute, i.e., a signal that indicates whether the target pixel belongs to a dot area or a non-dot area, is input to the terminal S of the selector 34 from the dot area identifying unit 33. Based on this construction, for pixels that belong to a dot area, the selector 34 selects image data that has undergone smoothing in order to prevent moire, and for pixels that belong to a non-dot area, image data that has undergone edge enhancement is selected.

Figure 5:
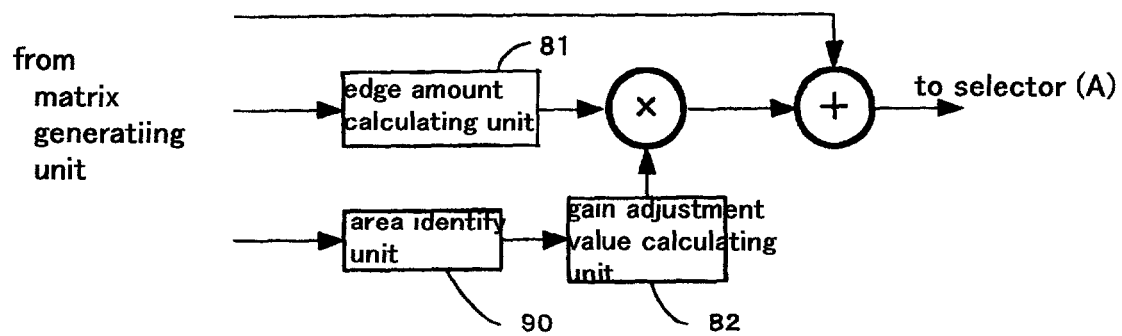
FIG. 5 is a block diagram illustrating the basic construction of the edge enhancing unit shown in FIG. 3.
Figure 6:
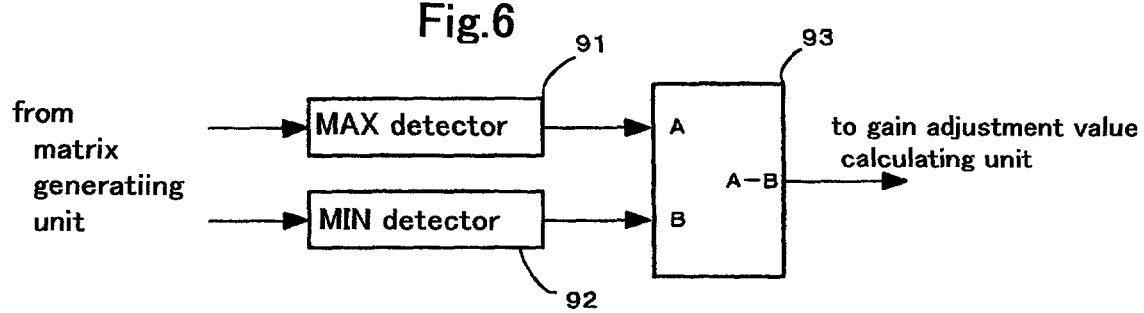
FIG. 6 is a block diagram illustrating the basic construction of the area identifying unit shown in FIG. 5.

The edge enhancing unit 31 includes, as shown in FIG. 5, an edge enhancement amount calculating unit 81, a gain adjustment value calculating unit 82 and an area identifying unit 90. The area identifying unit 90 includes, as shown in FIG. 6, a MAX value detecting unit 91, a MIN value detecting unit 92 and a subtracter 93. Through this construction, the area identifying unit 90 detects the largest density value (the MAX value) and the smallest density value (the MIN value) in the area of a certain size including the target pixel, and computes the difference therebetween (MAX−MIN).

The edge enhancement amount calculating unit 81 calculates how much edge enhancement should be performed using a differential filter such as a Laplacian filter, for example. The gain adjustment value calculating unit 82 calculates the gain adjustment value in accordance with the results of the determination carried out by the area identifying unit 90. The larger the density difference (MAX−MIN) is, the closer the gain adjustment value comes to '1'. Based on this construction, the edge enhancing unit 31 multiplies the edge enhancement amount calculated by the edge enhancement amount calculating unit 81 by the gain adjustment value calculated by the gain adjustment value calculating unit 82. The sum of this product and the density value of the target pixel is then output to the selector 34.

Figure 7:
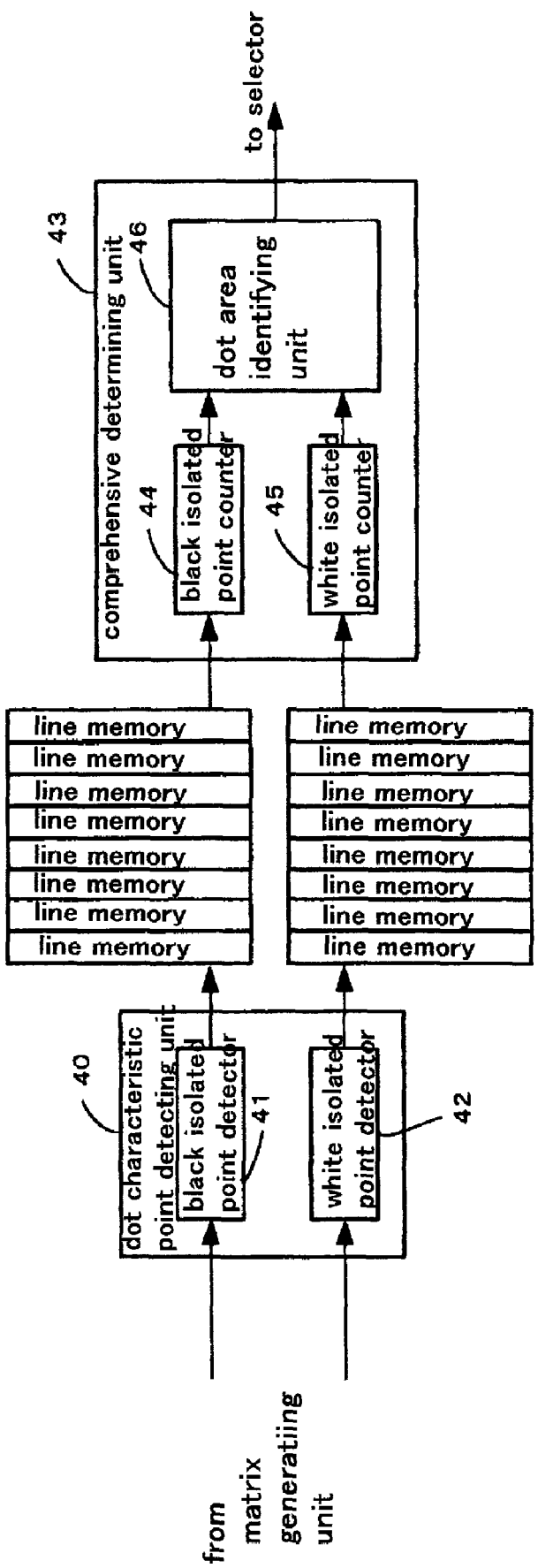
FIG. 7 is a block diagram illustrating the basic construction of a dot area identifying unit shown in FIG. 3.

With reference to FIG. 3, the dot area identifying unit 33 carries out the determination as to whether the target pixel belongs to a dot area or a non-dot area. The basic construction of the dot area identifying unit 33 is shown in FIG. 7. The dot area identifying unit 33 includes a dot characteristic point detecting unit 40 and a comprehensive determining unit 43.

The dot characteristic point detecting unit 40 detects isolated points having a density difference of a certain value or more from their surrounding pixels, using a detection filter of 3×3 pixel size. This dot characteristic point detecting unit 40 includes a black isolated point detecting unit 41 and a white isolated point detecting unit 42. The black isolated point detecting unit 41 determines that the target pixel V22 is a black isolated point when the density value of each pixel meets the following condition: V22>(MAX (V11, V12, V13, V21, V23, V31, V32, V33)+OFFSET1. OFFSET1 is the threshold value for black isolated point determination.

The white isolated point detecting unit 42 determines the target pixel V22 to be a white isolated point when the density value of each pixel meets the following condition; V22<MIN (V11, V12, V13, V21, V23, V31, V32, V33)−OFFSET2. OFFSET2 is the threshold value for white isolated point determination.

The comprehensive determining unit 43 counts the number of isolated points detected by the dot characteristic point detecting unit 40, and determines the attribute of the image (i.e., dot or non-dot) based on the count. This comprehensive determining unit 43 includes a black isolated point counter 44, a white isolated point counter 45 and a dot area identifying unit 46. The black isolated point counter 44 and white isolated point counter 45 count the number of black isolated points and the number of white isolated points, respectively, existing in an area of a certain size (e.g., 9×20 matrix) generated using a line memory.

Figure 8:
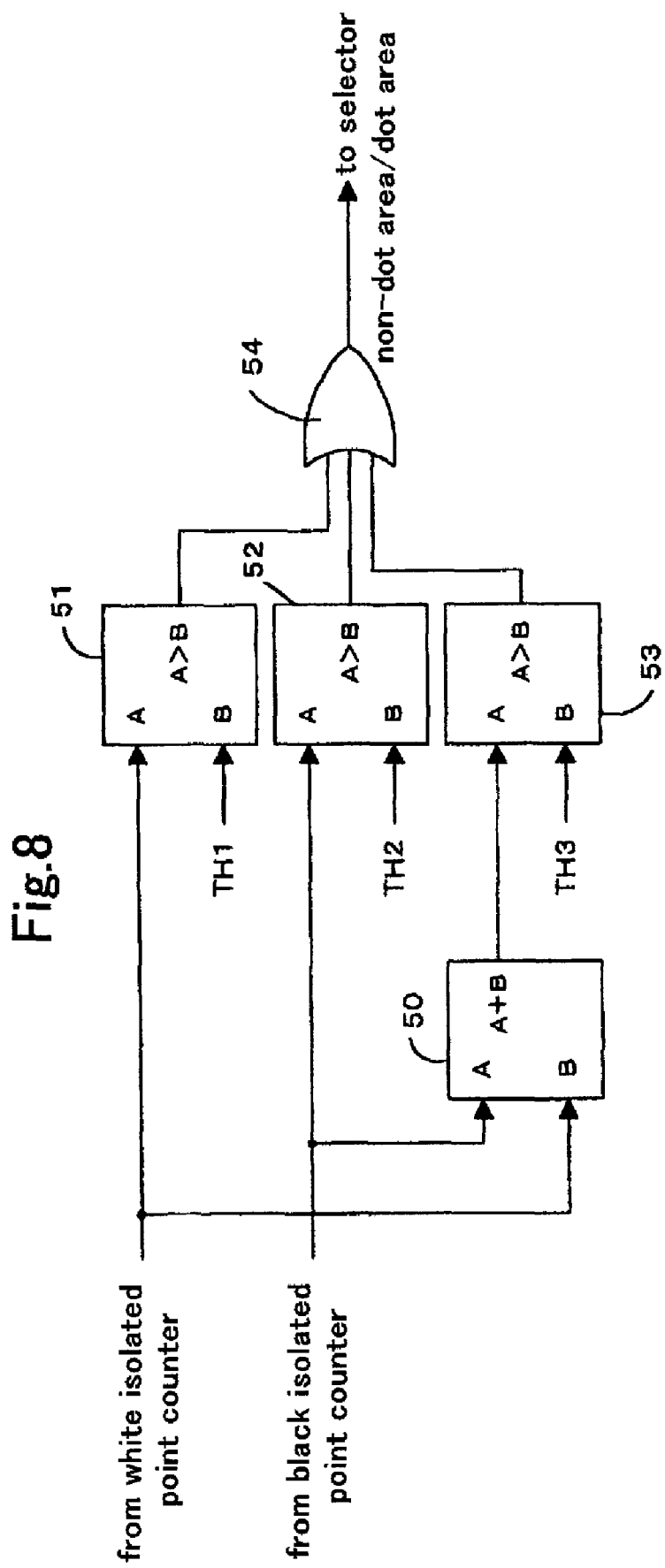
FIG. 8 is a circuit diagram illustrating the construction of the dot area identifying unit shown in FIG. 7.

The dot area identifying unit 46 makes the final determination regarding the attribute of the image (i.e., dot or non-dot) based on the count results arrived at by the black isolated point counter 44 and the white isolated point counter 45, and calculates the dot degree described below. This dot area identifying unit 46 comprises, as shown in FIG. 8, an adder 50, three comparators 51 through 53, and an OR circuit 54. The count value from the white isolated point counter 45 is input to the terminal A of the adder 50, and the count value from the black isolated point counter 44 is input to the terminal B thereof. The count value from the black isolated point counter 44 is input to the terminal A of the comparator 51, and a threshold value TH1 is input to the terminal B thereof. The count value from the white isolated point counter 45 is input to the terminal A of the comparator 52, and a threshold value TH2 is input to the terminal B thereof. The output result from the adder 50 is input to the terminal A of the comparator 53, and a threshold value TH3 is input to the terminal B thereof. The output results from the comparators 51 through 53 are input to the OR circuit 54. In this embodiment, the determination result regarding the image attribute, i.e., dot or non-dot, comprises a dot degree value. In other words, in this embodiment, the dot degree value is either 1 (dot) or 0 (non-dot). However, the present invention is not limited to this example; if the dot likelihood is expressed by one of multiple values ranging from 0 to 1 based on the count result of the white or black isolated points, more precision may be obtained.

Based on this construction, the dot area identifying unit 46 determines that the target pixel belongs to a dot area if at least one of the following conditions (1) through (3) is met. These three conditions are (1) the white isolated point count exceeds the threshold value TH1, (2) the black isolated point count exceeds the threshold value TH2, and (3) the sum of the black isolated point count and the white isolated point count exceeds the threshold value TH3.

In this embodiment, because the sum of the black isolated point count and the white isolated point count is used by the dot area identifying unit 46 for the determination of a dot area, dot area determination is carried out with accuracy. Dot area determination may also be made using the result of comparison between the white isolated point count and the threshold value TH1 or the result of comparison between the black isolated point count and the threshold value TH2 only. In addition, dot area determination may be made using the result of comparison between the sum of the black isolated point count and the white isolated point count and the threshold value TH3 only. Using the result of comparison between the sum and the threshold value TH3 only entails reduced determination accuracy but has the advantage that fewer line memories are needed.

Figure 9:
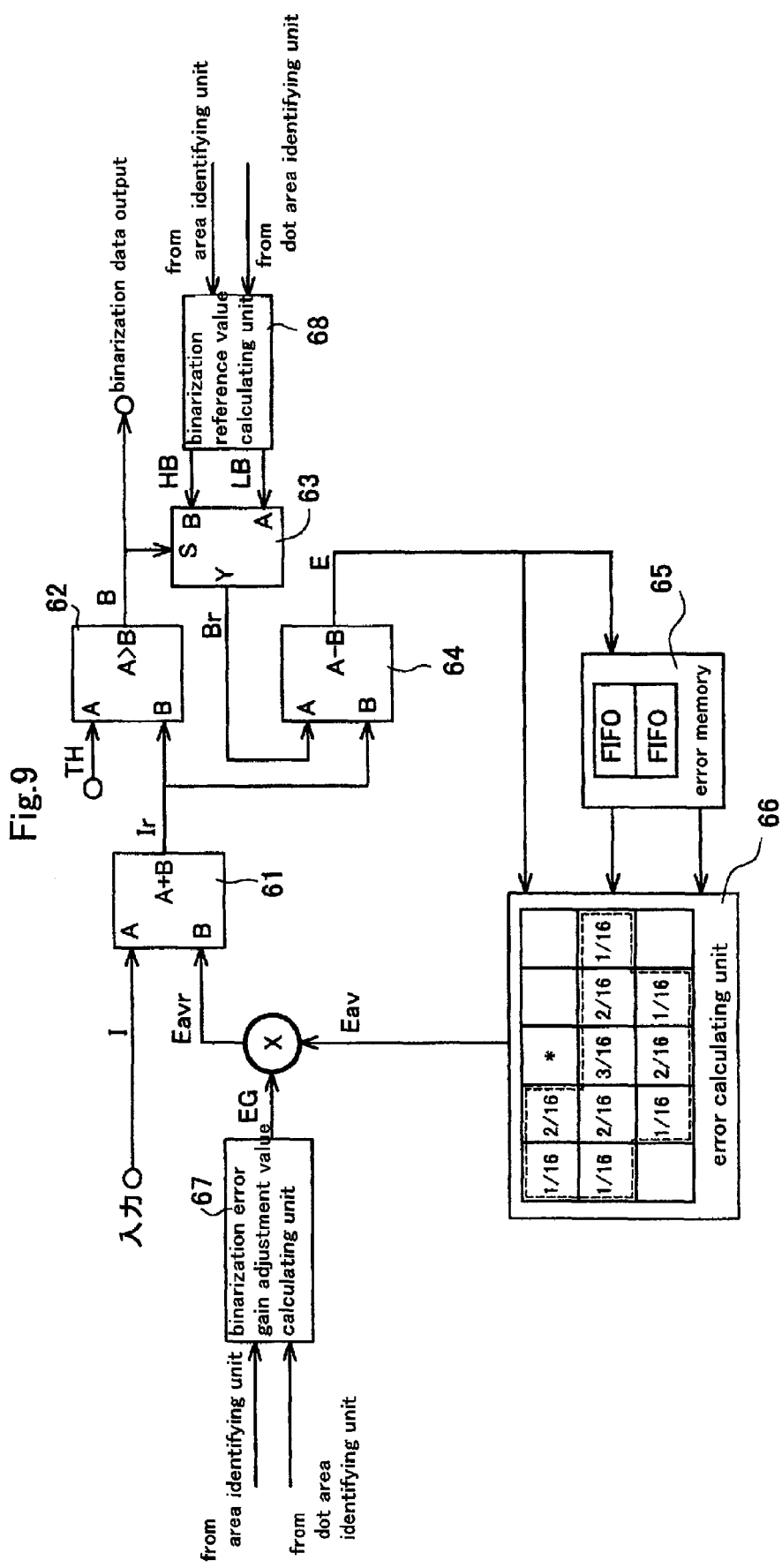
FIG. 9 is a block diagram illustrating the construction of a binarization circuit.

Referring to FIG. 2, the binarizing unit 25 includes an error diffusing binarization circuit that is shown in FIG. 9. This error diffusing binarization circuit includes an adder 61, a comparator 62 that compares correction data Ir output from the adder 61 and a threshold value TH and outputs binarization data B, a selector 63 that selects a binarization reference value (HB or LB) in accordance with the binarization data B output from the comparator 62, a subtracter 64 that calculates a binarization error E from the output Ir from the adder 61 and the output Br from the selector 63, an error storage memory 65 in which to store the binarization error E output from the subtracter 64, an error calculating means 66 that calculates a weighted average error Eav, a binarization error gain adjustment value calculating unit 67 that sets a value for the binarization error gain adjustment value EG, and a binarization reference value calculating unit 68 that sets the values for the binarization reference value HB and LB.

The comparator 62 outputs as the binarization output B '1' when the error-corrected multi-value image data Ir is larger than the threshold value TH, and outputs '0' otherwise. The selector 63 selects the binarization reference value HB when '1' is output by the comparator 62, and the binarization reference value LB when '0' is output.

The error calculating unit 66 performs weighting using a surrounding error weighting filter of 5×3 matrix size based on the binarization error E, and calculates a weighted average error Eav. The numbers shown in the surrounding error weighting filter are weighting coefficients, and the asterisk in the filter indicates the pixel currently undergoing processing.

The weighted average error Eav is corrected by the gain adjustment value EG, and a post-correction weighted average error Eavr is input to the terminal B of the adder 61. The binarization error is diffused via such circuit, and binarization using the density-preserving area gradation method is carried out by the binarization unit 25.

Figure 10:
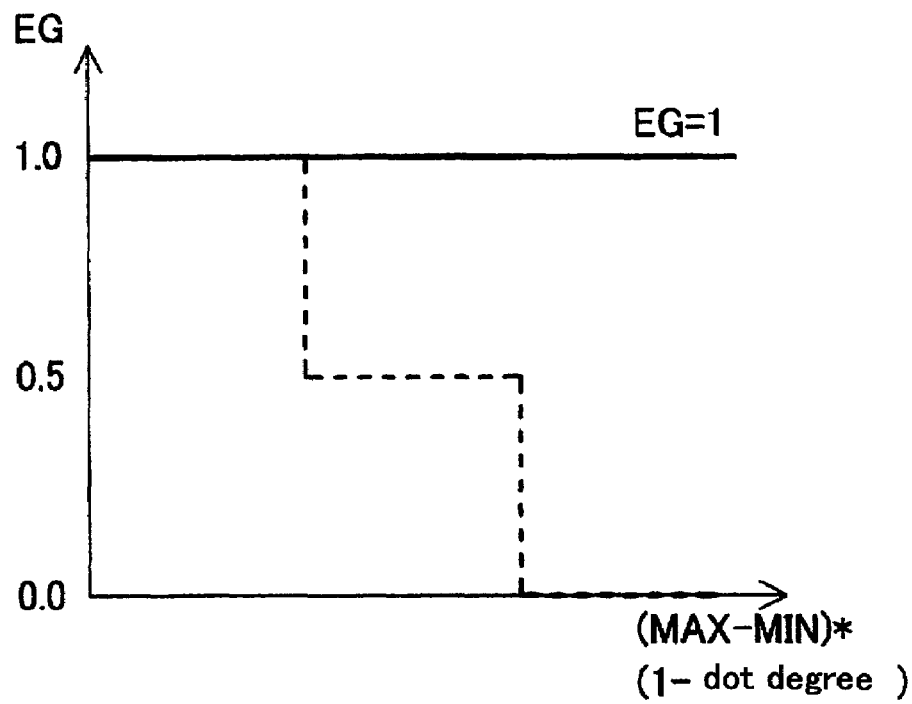
FIG. 10 is an illustration of an example of the setting of a binarization error gain adjustment value.

The setting of the gain adjustment value EG and the reference values HB and LB that are used during binarization will now be described. The gain adjustment value EG is set by the binarization error gain adjustment calculating unit 67 based on the results of the determination carried out by the area identifying unit 90 and the dot area identifying unit 33. Specifically, the binarization error gain adjustment value calculating unit 67 calculates '(MAX−MIN)×(1−dot degree)' based on the (MAX−MIN) input from the area identifying unit 90 and the dot degree value input from the dot area identifying unit 33. A value is set for the gain adjustment value EG in accordance with the calculation result, as shown by the dotted line in FIG. 10. For example, where the dot degree value is '1' (indicating a dot area), the gain adjustment value EG is set to The dot degree is a value that is calculated by the dot area identifying unit 46 based on the count values of black and white isolated points, and is an index of the likelihood of being a dot area. This dot degree may be any value between 0 and 1. The closer the dot degree is to 1, the more likely the image is determined to be a dot image. In this embodiment, the dot degree can be only one of two values, i.e., 0 or 1, but if the value is calculated based on the count values of the black and white isolated points such that it may take any one of multiple values between 0 and 1, the setting of the N-level conversion parameters may be carried out with increased precision.

Figure 11:
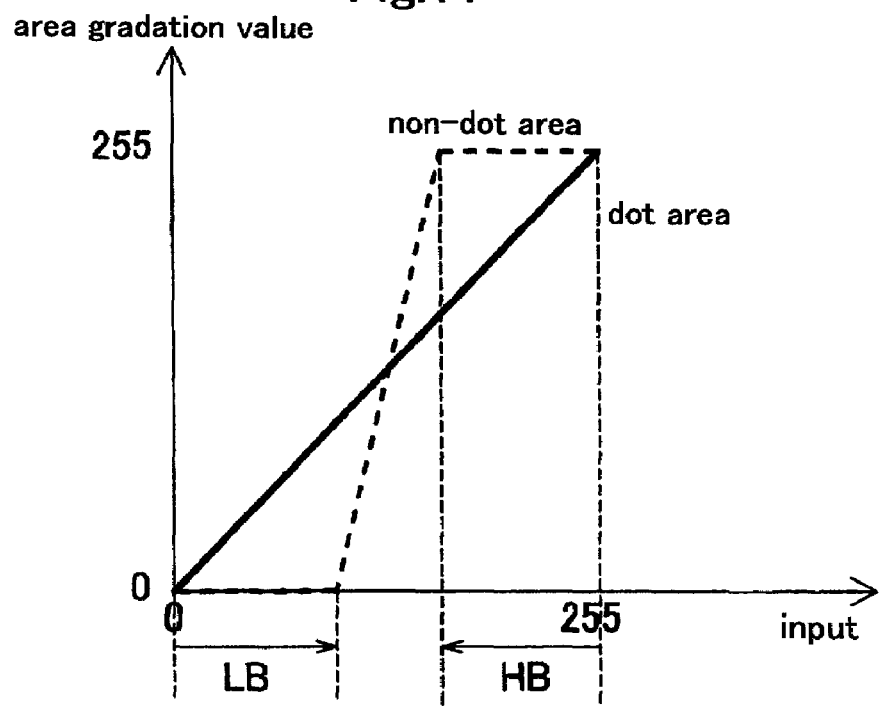
FIG. 11 is an illustration of an example of the setting of a binarization reference value.
Figure 12:
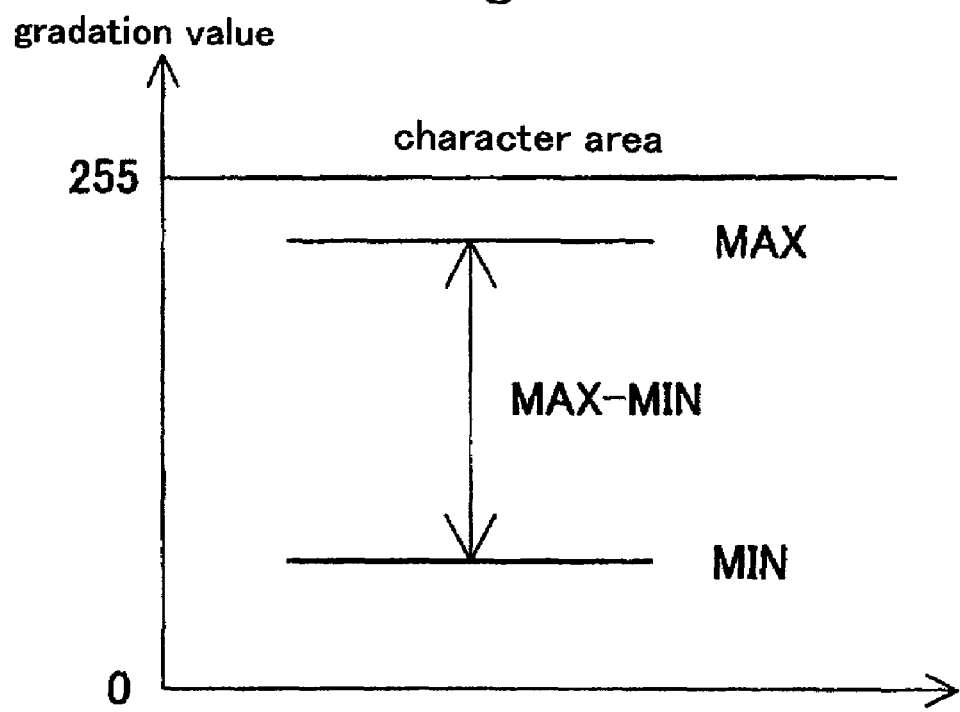
FIG. 12 is an illustration showing the density difference characteristics in a character area.
Figure 13:
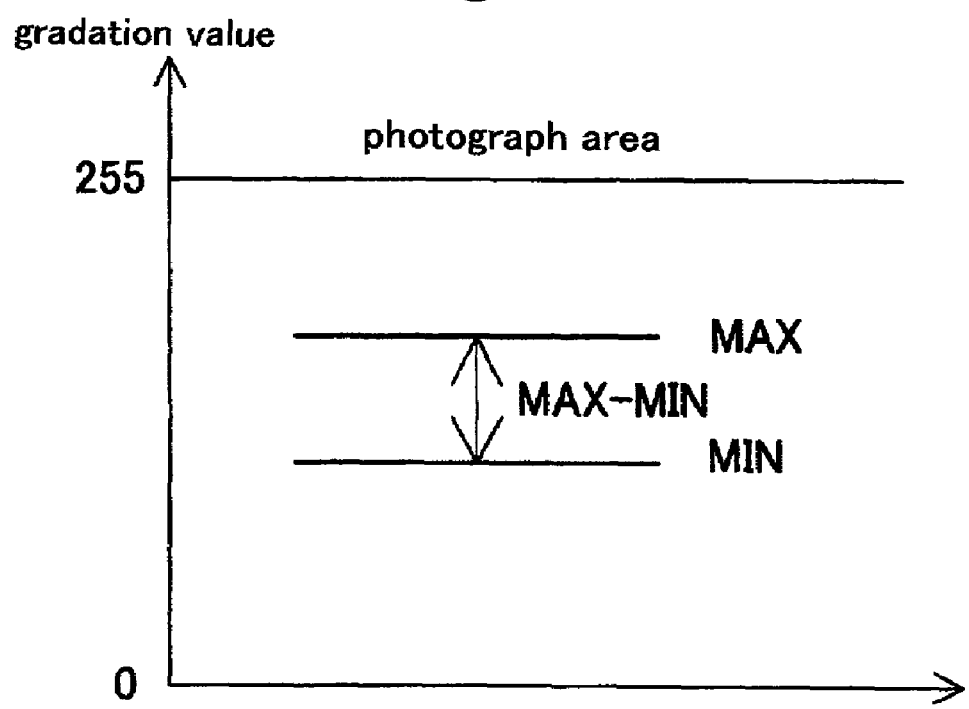
FIG. 13 is an illustration showing the density difference characteristics in a photograph area.
Figure 14:
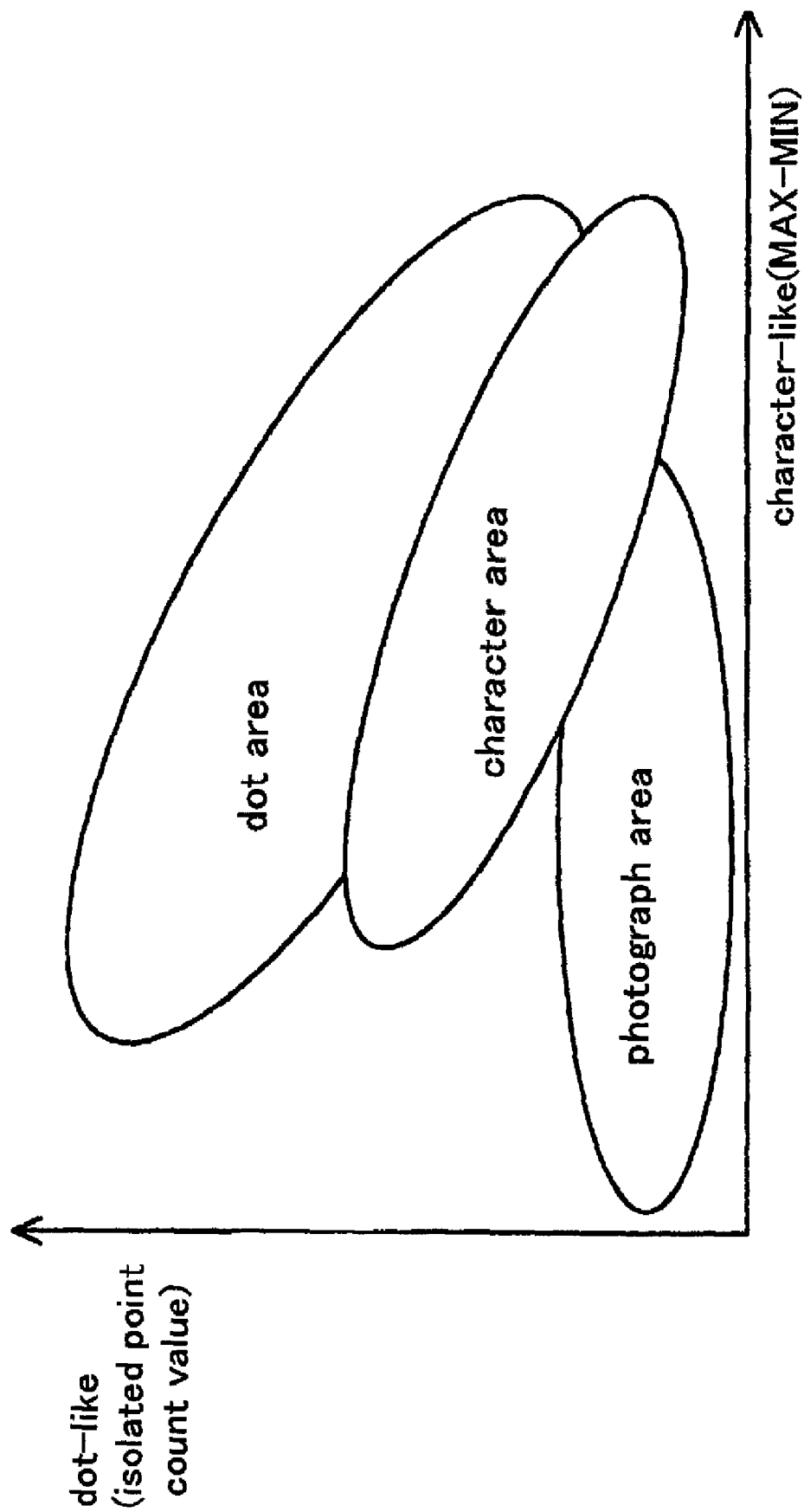
FIG. 14 is an illustration showing the characteristics of each area in a simplified fashion.

The binarization reference values HB and LB are set by the binarization reference value calculating unit 68 based on the results of the determination carried out by the area identifying unit 90 and the dot area identifying unit 33. Specifically, the binarization reference value calculating unit 68 calculates '(MAX−MIN)×(1−dot degree)' based on the (MAX−MIN) input from the area identifying unit 90 and the dot degree input from the dot area identifying unit 33. Values are then specified for both the binarization reference values HB and LB, as shown in FIG. 11, based on the calculation result. For example, where the dot degree is '1', HB is set to 255 and LB is set to 0.

The operation of the digital reproduction machine having the above construction will now be described. First, the image information pertaining to the original document is read by the image input unit 11. The image data read by the image input unit 11 is transmitted to the image processing unit 12. The image processing unit 11 then sequentially carries out shading correction, LOG conversion, magnification, MTF correction, density correction and binarization with regard to the image data. Based on the image data that has undergone the various types of image processing, the image output unit 13 creates a reproduced image of the original document on the recording medium, and the recording medium on which an image has been formed is ejected outside the machine. This completes a copying operation for one sheet.

The processes of MTF correction and binarization, which are included in the series of copying processes described above, will now be described in detail. The MTF correction carried out by the MTF correction unit 23 will first be described. The matrix generating unit 30 converts the image data output from the magnifying unit 22 into 5×5 matrix image data having the raster construction shown in FIG. 4. Detection of isolated points is performed by the dot characteristic point detecting unit 40 with regard to 3×3 matrix image data belonging to this 5×5 matrix image data.

3×3 matrix image data is used in the detection of isolated points in this embodiment, but naturally, 5×5 image data may be used instead, because if 5×5 matrix image data is used, such errors as misidentification of image noise as isolated points may be reduced.

When the detection of isolated points by the dot characteristic point detecting unit 40 is completed, a line memory is used to generate a two-dimensional local area (a 9×41 matrix) in which to count isolated points. This area is generated so that black isolated points and white isolated points may be separately counted. The number of black isolated points existing in the area is counted by the black isolated point counter 44. Similarly, the number of white isolated points existing in that area is counted by the white isolated point counter 45.

When the counting by the black isolated point counter 44 and by the white isolated point counter 45 is completed, the count results are input to the dot area identifying unit 46. The comparator 51 then determines whether the white isolated point count is larger than the threshold value TH1, the comparator 52 determines whether the black isolated point count is larger than the threshold value TH2, and the comparator 53 determines whether the sum of the black and white isolated point counts is larger than the threshold value TH3. Where the input value is larger than the respective threshold value, the respective comparator 51 through 53 outputs '1', and where the input value is smaller, it outputs '0'.

The outputs from the comparators 51 through 53 are input to the OR circuit 54. Where one of the signals input to the OR circuit 54 is '1', the OR circuit outputs '1'. That is, the dot area identifying unit 46 determines that the target pixel belongs to a dot area. On the other hand, where all of the outputs from the comparators 51 through 53 are '0', '0' is output from the OR circuit 54. That is, the dot area identifying unit 46 determines that the target pixel belongs to a non-dot area.

The results of the determination carried out by the dot area identifying unit 46 are input to the terminal S of the selector 34 included in the MTF correction unit 23. The selector 34 then selects the image data that has undergone processing by the smoothing unit 32 as image data for a pixel determined to belong to a dot area. It selects the image data that has undergone processing by the edge enhancing unit 31 as image data for a pixel determined to belong to a non-dot area. This completes the process of MTF correction.

The process of binarization by the binarizing unit 25 will now be described. The multi-value image data I output from the density correction unit 24 and the weighted average error Eav calculated by the error calculating means 66 and corrected using the gain adjustment value EG are added together by the adder 61 to calculate corrected data Ir. The corrected data Ir is input to the terminal B of the comparator 62 and the terminal B of the subtracter 64. The comparator 62 compares the corrected data Ir and the threshold value TH and a binarization result B is output.

Based on the binarization result B, the selector 63 selects a binarization reference value Br. The binarization reference value Br selected here is input to the terminal A of the subtracter 64. The binarization reference value Br is either HB or LB. The values for HB and LB are set by the binarization reference value calculating unit 68 based on the results of the determination carried out by the area identifying unit 90 and the dot area identifying unit 33. For example, HB is set to 255 and LB is set to 0 for a dot area. Consequently, binarization preserving linear gradation is carried out with regard to dot areas. Therefore, the occurrence of moire in dot areas that occurs due to binarization may be prevented.

Subsequently, the subtracter 64 calculates a binarization error E from the binarization reference value Br and the corrected data Ir. This binarization error E is output to the error storage memory 65 and the error calculating unit 66 such that a weighted average error Eav will be calculated. The binarization error E for several lines that are aligned in the secondary scanning direction is then stored in the error storage memory 65, and is provided to the error calculating unit 66.

The error calculating unit 66 then multiplies the binarization error E by the weighting coefficient and a weighted average error Eav is calculated. This weighted average error Eav is corrected using the gain adjustment value EG, and the corrected result is input to the terminal B of the adder 61. The gain adjustment value EG is set by the binarization error gain adjustment calculating unit 67 in accordance with the results of the determination carried out by the area identifying unit 90 and the dot area identifying unit 33. For example, the gain adjustment value EG is set to '1' for a dot area. Consequently, binarization in which errors of the surrounding pixels are optimally propagated, i.e., binarization in which gradation is preserved, is carried out regarding dot areas. Therefore, the occurrence of moire in dot areas occurs due to binarization is prevented.

The same processing is thereafter performed on each pixel, and binarization of the image is completed. As described above, in the binarizing unit 25, the binarization reference values HB and LB and the gain adjustment value EG are set to values in accordance with the attribute of the image. Binarization then takes place using the binarization reference values HB and LB and the gain adjustment value EG that are appropriate for each area of the image. Consequently, binarization that prevents the occurrence of moire is carried out regarding dot areas.

As described in detail above, according to the reproduction machine of this embodiment, the MTF correction unit 23 includes an area identifying unit 90 that distinguishes character areas from photograph areas and a dot area identifying unit 33 that identifies dot areas. The attribute of the image therefore may be accurately determined. The binarizing unit 25 includes a binarization error gain adjustment calculating unit 67 and binarization reference value calculating unit 68 that set based on the results attained by these identifying units a gain adjustment value EG and binarization reference values HB and LB that are used for the binarization process carried out by the binarizing unit 25. Therefore, the gain adjustment value EG and the binarization reference values HB and LB are set to values that are appropriate for the attribute of the image, and binarization is executed using these optimal values. Consequently, binarization in which the occurrence of moire is prevented may be performed regarding dot areas. In other words, the occurrence of moire in dot areas that occurs due to binarization may be prevented.

The embodiment described above is only an example, and does not restrict the present invention in any way whatsoever. Various improvements and modifications are naturally possible within the scope of the essence of the present invention. For example, in the above embodiment, both the binarization error gain adjustment value EG and the binarization reference values HB and LB are variable, but the same effect may be obtained even if only one of these parameters is variable. In addition, the above description concerned a situation in which the present invention is applied in a digital reproduction machine, but the present invention may be applied in a printer, facsimile machine or the like in addition to a reproduction machine. Moreover, needless to say, the specific numbers (such as the matrix size, for example) indicated in the embodiment are mere examples.

According to the embodiment described above, an image processing apparatus that is capable of preventing the moire phenomenon that occurs when image data in a dot area is converted into N-value image data (i.e., when the number of gradations in that area is reduced) is provided.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image processing apparatus that carries out image processing on M-level image data in accordance with image attribute, the image processing apparatus comprising:
    a dot characteristic point extracting device that extracts dot characteristic points from the M-level image data;
    a dot area identifying device that determines whether a target pixel belongs to a dot area based on the results of the extraction carried out by the dot characteristic point extracting device;
    an N-level conversion unit that converts the M-level image data into N-level image data (M>N); and
    a parameter setting unit that sets the N-level conversion parameters used by the N-level conversion unit based on the results of the determination carried out by the dot area identifying device.

2. An image processing apparatus as claimed in claim 1, further comprising:
    an area identifying device that determines whether the target pixel belongs to a character area or a photograph area,
    wherein the parameter setting unit specifies N-level conversion parameters in the N-level conversion unit based on the results of the determination carried out by the area identifying device and the results of the determination carried out by the dot area identifying device.

3. An image processing apparatus as claimed in claim 2, wherein said area identifying device determines whether the target pixel belongs to a character area or a photograph area based on the difference between the largest density value and the smallest density value in the area of a certain size including the target pixel.

4. An image processing apparatus as claimed in claim 1, wherein said N-level conversion unit performs N-level conversion of M-level image data using the error diffusion method.

5. An image processing apparatus as claimed in claim 4, wherein the N-level conversion parameters set by the parameter setting unit include an N-level conversion error gain adjustment value.

6. An image processing apparatus as claimed in claim 4, wherein the N-level conversion parameters set by the parameter setting unit include an N-level conversion reference value.

7. An image processing apparatus as claimed in claim 6, wherein the N-level conversion reference value is used for calculation of binarization error that is found by subtraction of the N-level conversion reference value and an error-corrected M-level image data in the error diffusion method.

8. An image processing apparatus as claimed in claim 1, wherein said dot characteristic point extracting device extracts as dot characteristic points isolated points having a density difference of a specified minimum value from their surrounding pixels, and said dot area identifying device identifies a dot area by comparing with a specified threshold value the number of isolated points existing in an area of a specified size that includes the target pixel.

9. An image processing method for carrying out image processing on M-level image data in accordance with image attribute, the image processing method comprising the steps of:
    extracting dot characteristic points from the M-level image data;
    determining whether a target pixel belongs to a dot area based on the dot characteristic point extraction result;
    setting N-level conversion parameters based on the dot area determination result; and
    converting the M-level image data into N-level image data (M>N) using the set N-level conversion parameters.

10. An image processing method as claimed in claim 9, further comprising the step of:
    determining whether the target pixel belongs to a character area or a photograph area,
    wherein said N-level conversion parameters are set based on the results of the determination whether the target pixel belongs to a character area or a photograph area and the dot area determination result.

11. An image processing method as claimed in claim 10, wherein said N-level conversion of M-level image data using the error diffusion method.

12. An image processing apparatus as claimed in claim 11, wherein the N-level conversion parameters include an N-level conversion reference value.

13. An image processing method as claimed in claim 11, wherein the N-level conversion parameters include an N-level conversion error gain adjustment value.

14. An image forming apparatus comprising:
    an input unit that inputs M-level image data;
    a dot characteristic point extracting device that extracts dot characteristic points from the M-level image data;
    a dot area identifying device that determines whether a target pixel belongs to a dot area based on the results of the extraction carried out by the dot characteristic point extracting device;
    an N-level conversion unit that converts the M-level image data into N-level image data (M>N);
    a parameter setting unit that sets the N-level conversion parameters used by the N-level conversion unit based on the results of the determination carried out by the dot area identifying device; and
    an output unit that outputs an image based on the N-level image data.

* * * * *